United States Patent [19]

Scott

[11] Patent Number: 5,512,917

[45] Date of Patent: Apr. 30, 1996

[54] OBSCURING SYSTEM FOR AN AIRCRAFT GYROSCOPIC INSTRUMENT

[76] Inventor: Thomas F. Scott, 1588 Princeton West Trail, Marietta, Ga. 30062

[21] Appl. No.: 450,335

[22] Filed: May 25, 1995

Related U.S. Application Data

[63] Continuation-in-part of Ser. No. 277,180, Jul. 19, 1994, abandoned, and Ser. No. 277,181, Jul. 19, 1994, abandoned.

[51] Int. Cl.[6] ........................................... G09G 3/34
[52] U.S. Cl. ................................. 345/109; 345/87
[58] Field of Search ........................ 345/87, 4, 1, 109, 345/108, 7, 86; 340/635

[56] References Cited

U.S. PATENT DOCUMENTS 4,862,149  8/1989  Boyer ..................................... 340/635
4,893,903  1/1990  Thakar et al. ............................ 345/86

*Primary Examiner*—Richard Hjerpe
*Assistant Examiner*—Kent Chang
*Attorney, Agent, or Firm*—Rodgers & Rodgers

[57] ABSTRACT

An obscuring system for an aircraft gyroscopic instrument includes a liquid crystal light valve constructed so as to be transparent when not powered and opaque when effectively energized. Independent means for energizing the instrument may include a source of electric power or means responsive to gaseous pressure. An electric transformer is arranged so as to energize the liquid crystal light valve in response to a system fault on demand by the user to render the liquid crystal light valve opaque.

4 Claims, 3 Drawing Sheets

1

OBSCURING SYSTEM FOR AN AIRCRAFT GYROSCOPIC INSTRUMENT

This is a continuation-in-part of application Ser. Nos. 08/277,180 and 08/277,181 both filed Jul. 19, 1994, both now abandoned.

TECHNICAL FIELD

This invention concerns an obscuring system for an aircraft gyroscopic instrument which utilizes a liquid crystal light valve constructed so as to be transparent when not energized and opaque when properly energized.

BACKGROUND ART

U.S. Pat. No. 4,371,870, issued Feb. 1, 1983, discloses a display system arranged to operate as a back up for a primary liquid crystal display.

U.S. Pat. No. 4,562,433, issued Dec. 31, 1985, discloses an arrangement similar to the aforementioned U.S. Pat. No. 4,371,870.

U.S. Pat. No. 4,568,928, issued Feb. 4, 1986 is generally related to the above two references.

SUMMARY OF THE INVENTION

When under stressful conditions, the crew of an aircraft may be engaged in activity which is vital to safety and a redundant indication of a system condition simply adds to crew stress. According to this invention, obscuring of a failed gyroscopic instrument reduces crew stress and hence may be particularly worthwhile. Under some conditions it may be necessary for the crew to manually prevent obscuration in cases where automatic sensors have malfunctioned. Crew training and testing also requires that the crew demonstrate the ability to operate the aircraft safely with one or more of the gyroscopic instruments inoperative. In the case of gyroscopic instrument failure, a flight crew has been trained to operate the aircraft safely with the remaining instruments available. This continued operation is made much more difficult when the instruments provide conflicting information. The improvement prevents the display of erroneous information to the crew and also allows the simulation of such condition in the training and test environments. According to features of this invention, provision is made for all of these conditions to be accommodated.

DISCLOSURE OF THE INVENTION

An obscuring system for an aircraft gyroscopic instrument, according to one form of this invention, comprises an electric power supply adapted to energize the obscuring system, a liquid crystal light valve constructed so as to be transparent when not energized and opaque when properly energized together with a voltage controlled transformer arranged to energize the liquid crystal light valve whenever the power supply is effective operably to energize the transformer.

BEST MODE OF CARRYING OUT THE INVENTION

Figure 1:
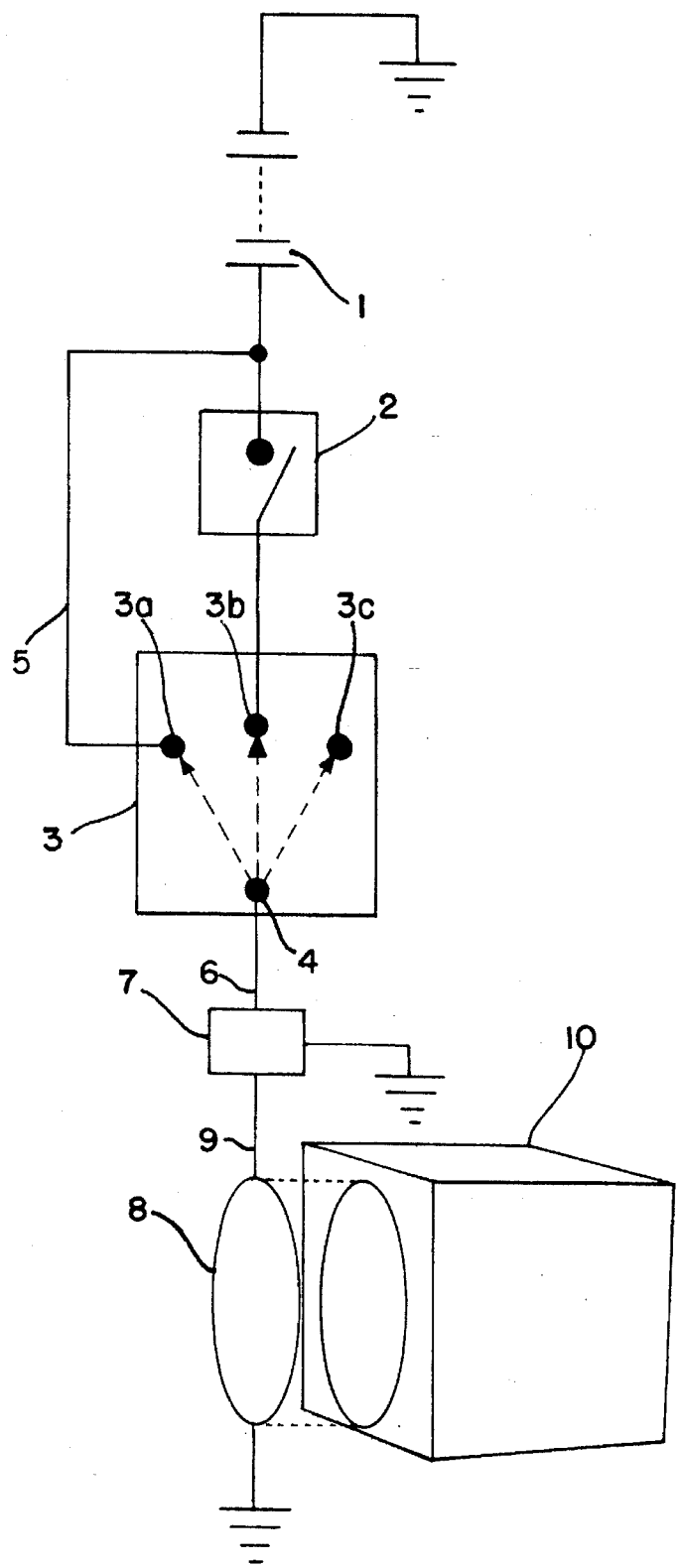
FIG. 1 is a schematic representation of certain features of the invention.
Figure 2:
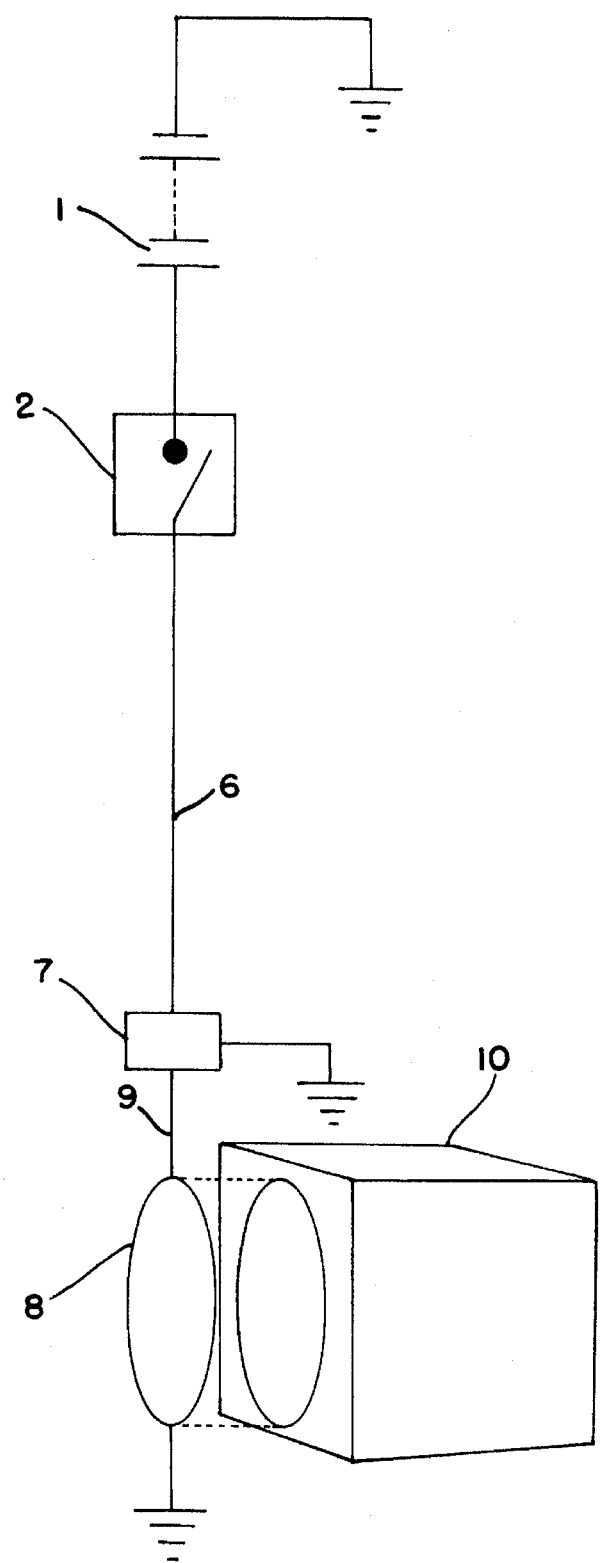
FIG. 2 is a view similar to FIG. 1 except that it does not include a control switch.

As shown in FIG. 1, the numeral 1 designates the power supply such as a DC battery one terminal of which is grounded and the ether terminal of which is connected to a circuit element. One of the circuit elements is a sensor switch identified by the numeral 2. This sensor switch is normally open, but closes upon detection of a system fault. Control switch 3 includes an outlet terminal 4 which may be connected to inlet terminals 3a, 3b or 3c, as may be desired. Conductor 5 directly connects a pole of power supply 1 with terminal 3a of control switch 3. When so connected, terminal 4 of control switch 3 is connected through conductor 6 to transformer 7 which in turn is suitably grounded and which also is interconnected with liquid crystal light valve 8 by means of conductor 9. In accordance with one feature of this invention, the liquid crystal light valve 8 is transparent when not powered and opaque under all other conditions.

Figure 3:
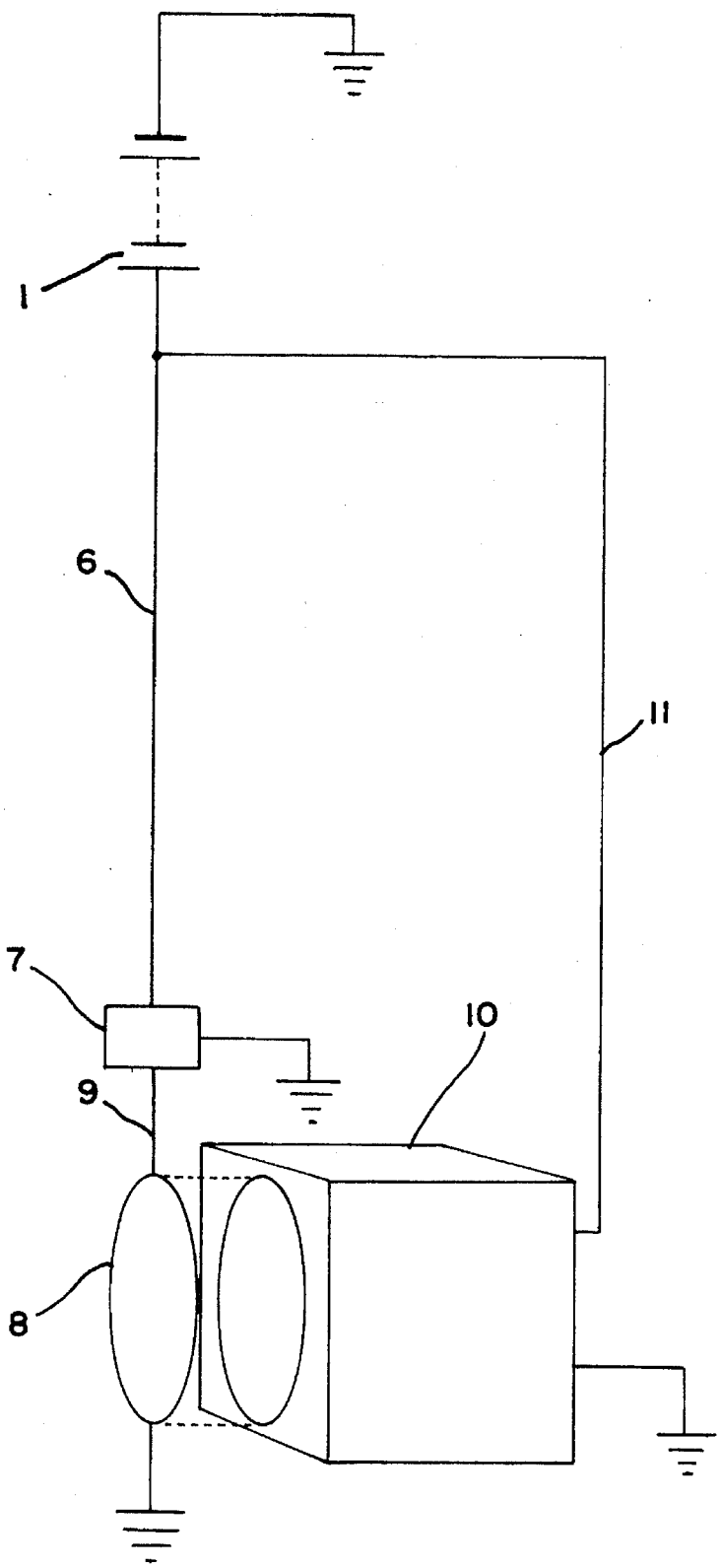
FIG. 3 is a view similar to FIG. 2 but includes a shunt circuit about the control and sensor switches.

Main battery 1 supplies energy directly to pole 3a of the pilot controlled three way switch 3 via conductor 5. Power is indirectly supplied through sensor switch 2 to pole 3b and in turn through conductor 6 to voltage controlled transformer 7. The output is supplied to conductor 9 and serves to energize liquid crystal light valve 8 rendering the liquid crystal light valve 8 opaque when properly energized and so as to obscure the gyroscopic instrument 10 from the view of the aircraft pilot. In FIG. 3, one terminal of the power supply is grounded and the other terminal is connected to circuit elements and to the gyroscopic instrument through conductor 11.

Sensor switch 2 is normally open and is fault responsive so that, when closed due to low vacuum for example, light valve 8 is energized through conductor 3b, terminal 4, conductor 6, transformer 7 and conductor 9 to liquid crystal light valve 8. This circuit renders the light valve 8 opaque and obscures the instrument 10 from the view of the pilot.

When energy is not supplied in appropriate fashion to voltage controlled transformer 7, the liquid crystal light valve 8 is transparent. When pole 3b is closed, light valve 8 is energized when the sensor switch 2 detects a fault and the light valve is opaque. Had the pilot selected pole 3a, the light valve would be energized so long as main voltage is available. This approach is appropriate for test or training purposes. Should pole 3c be selected, the light valve 8 remains transparent under all conditions. This would provide a safety backup in case the sensor switch 2 proves to be defective.

I claim:

1. An obscuring system for an aircraft gyroscopic instrument arranged to avoid distracting the attention of crew members during critical flying conditions and comprising means for energizing said system, a liquid crystal light valve constructed so as to be transparent when not powered and opaque when effectively energized, an electric transformer arranged so as to energize said liquid crystal light valve whenever said power supply is effective to operably energize said transformer, a protective sensor switch responsive to a predetermined fault condition to energize transformer and to render said light valve opaque, a control switch having a plurality of circuits one of which directly connects said power supply to said transformer in a shunt circuit parallel to said sensor switch, another of said circuits which is in series with said sensor switch causes said light valve to become energized when said sensor switch closes in response to the detection of a fault condition, yet another of said circuits when closed causes said light valve to remain transparent.

2. An obscuring system according to claim 1 wherein means for energizing said system comprises an independent source of electric power.

3. An obsuring system according to claim 1 wherein said protective sensor switch is open under normal conditions.

4. An obsuring system according to claim 1 wherein a control switch is arranged in series between said power supply and said transformer for manually energizing and deenergizing said transformer.

\* \* \* \* \*

UNITED STATES PATENT AND TRADEMARK OFFICE
CERTIFICATE OF CORRECTION

PATENT NO. : 5,512,917
DATED : April 30, 1996
INVENTOR(S) : Thomas F. Scott

It is certified that error appears in the above-indentified patent and that said Letters Patent is hereby corrected as shown below:

Column 4, line 3, cancel "obsuring" and substitute -- obscuring--.

Column 4, line 5, cancel "obsuring" and substitute -- obscuring--.

Signed and Sealed this

Nineteenth Day of November, 1996

*Attest:*

BRUCE LEHMAN

*Attesting Officer*     *Commissioner of Patents and Trademarks*